Oct. 25, 1960   C. C. EDWARDS   2,958,023
ELECTRICAL CAPACITOR AND TERMINAL ARRANGEMENT THEREFOR
Filed April 21, 1958

Inventor,
Carleton C. Edwards,
by Gilbert P. Tarleton
His Attorney.

United States Patent Office 2,958,023
Patented Oct. 25, 1960

2,958,023

ELECTRICAL CAPACITOR AND TERMINAL ARRANGEMENT THEREFOR

Carleton C. Edwards, Fort Edward, N.Y., assignor to General Electric Company, a corporation of New York Filed Apr. 21, 1958, Ser. No. 729,668

5 Claims. (Cl. 317—261)

The present invention relates to electrical capacitors, and more particularly to an improved terminal connection therefor. The invention has particular application to capacitors of stacked or wound type having projecting armature foils.

The connections of terminal leads to capacitors of the above type by prior methods have had various drawbacks. For example, in the common arrangement whereby short lengths of wire are soldered at one end to the foil ends, the soldered connection is mechanically weak and will not withstand repeated flexing or pulling of the lead without rupturing or separating from the foils. Other types of connections have also been found unsatisfactory for one reason or another, such as their high cost of manufacture, inadequate flexibility, limited resistance to mechanical stress, or poor electrical contact. Experience has shown that purely mechanical connecting means, such as staples, rivets, bolts or stitches are particularly unsuitable under high temperature operations, since oxidation takes place at the contact surfaces, creating high resistance and resulting in poor performance or premature failure of the capacitor.

It is an object of the invention to provide capacitors with improved terminal connections which avoid the disadvantages of known types of terminal connections.

It is another objects of the invention to provide a capacitor terminal connection which is extremely simple, readily made and affords good electrical contact and superior mechanical strength even under severe pulling or flexing stresses on the terminal lead.

With the above objects in view, the present invention relates to an electrical capacitor comprising alternating layers of conductive foil and dielectric material with the margins of certain of the foil layers projecting beyond the margins of the other foil layers at an end of the capacitor, the projecting foil layers being formed inwardly of their outer edges with openings defining a passage therethrough, and a lead wire joined at one end, such as by welding, to the projecting foil edges and extending through the aperture in the foil layers.

In a preferred embodiment of the invention, the projecting foil margins are compressed together and folded over against the end of the capacitor, the folded-over foil margins having a conductive strip welded or otherwise secured thereto, and the terminal lead wire which passes through the described aperture being joined to the conductive strip.

The invention will be better understood from the following description, taken in conjunction with the accompanying drawing, in which.

Figure 1:
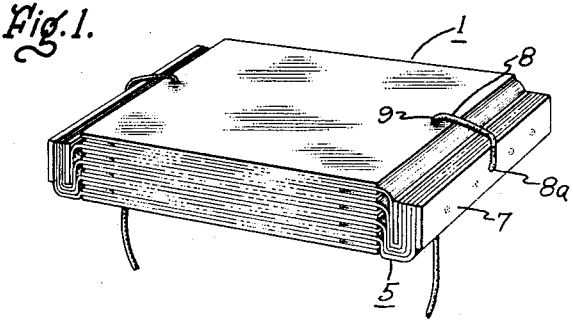
Fig. 1 is a perspective view of a stack-type exposed foil capacitor embodying the present invention.
Figure 2:
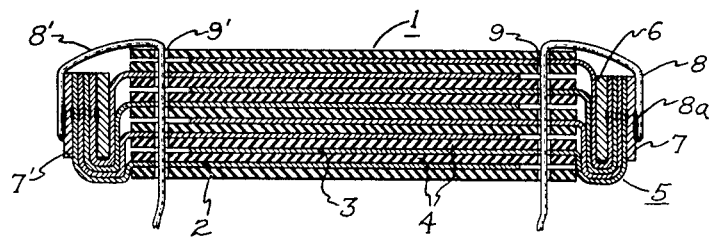
Fig. 2 is a sectional view of the device shown in Fig. 1.

Referring now to the drawing and particularly to Figs. 1 and 2, there is shown a laminated stack-type capacitor 1 comprising alternating armature foils 2 and 3 of opposite polarity separated by dielectric sheets 4. Foils 2 and 3 may be of any suitable conductive material such as aluminum, copper, tin, stainless steel, or the like and dielectric sheets 4 may be of conventional insulating material such as paper, mica (including reconstituted mica) synthetic resin films, glass fiber, and other known dielectric materials. In laminated types of capacitors such as shown, dielectric sheets 4 are normally impregnated with a bonding material such as a silicone resin, and the stack of alternating layers of foil and dielectric material is subjected to pressure and heat to produce a unitary laminated assembly.

Foils 2 and 3 project from the laminated stack at opposite ends to provide exposed foil edges to which conducting leads or wires may be electrically connected. In accordance with the invention, the projecting margins 5 of the foils at each end are pressed together and folded over against the end of the stack. The edge portions of foil margins 5 are sandwiched between inner metal strip 6 and outer metal strip 7 which are spot-welded or otherwise suitably joined thereto, the strips 6, 7 being substantially thicker than the individual foils. Satisfactory materials for the strips are, for example, aluminum, stainless steel, and the like, the strips typically being about 10 times as thick as the individual foil sheets. As will be understood, the description herein of the terminal structure at one end of the capacitor applies similarly to that at the other end.

Metal strips 6 and 7 are provided primarily as reinforcement for the foil edge portions and to provide a solid base to which wire leads can be joined. However, if desired, they may be dispensed with, particularly where the electrode foils are of sufficient thickness themselves to provide the necessary mass or strength for joining the wire leads thereto.

Secured to the outer surface of outside metal strip 7 is a lead wire 8, the wire being composed, for example, of nickel-plated copper or stranded nickel wire, or any other suitable wire conductor material, and being resistance welded or otherwise joined in good electrical connection to strip 7. From its juncture with strip 7, wire lead 8 passes in a bend around the corner of the stack 1 over the open side of the folded foil margins 5 and then through a passage 9 formed by aligned apertures in the stacked foils 2 and 3 and dielectric sheets 4 spaced inwardly of their outer edges, as shown in Fig. 2. Preferably, passage 9 in the stack has a diameter only slightly larger than that of lead wire 8. The snug fit of lead wire 8 in the passage 9, coupled with the binding action of the wire in its contact on the surface and corners of the stacked assembly adjacent the opening therein provides for considerable resistance to pulling and flexing stresses on the wire, and it thereby relieves the soldered or welded lead joint 8a of such stresses.

Figure 3:
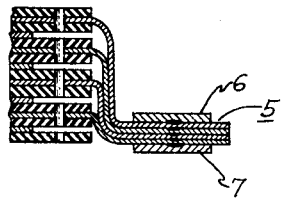
Fig. 3 is a fragmentary sectional view of the Fig. 1 device illustrating a stage in the assembly of the capacitor.

In a typical procedure for making the device shown in Figs. 1 and 2, the projecting foil margins are initially brought down and bent outwardly in compressed form at about the level of the lowermost foil, as shown in Fig. 3. The inner and outer metal strips 6, 7 are then spot-welded to the compressed foil margins 5 sandwiched therebetween and the thus welded foil margins are folded flat against the end of the capacitor stack assembly 1, so that the outer metal strip 7 is left exposed. The stack 1 is then pressed under heat in the laminating stage, wherein a pressure of 500–1000 p.s.i. at a temperature of 150–400° C. for a suitable period may typically be employed. Suitable apertures 9 are then drilled or otherwise formed inwardly of the stacked edges, and lead wire 8 is welded to the exposed surface of strip 7. The other end of wire 8 is threaded back into the hole 9 with the wire passing over the open side of folded foil margins 5, thus tending to press the folded margins flat against the capacitor stack when the wire 8 is pulled snugly through the holes 9 and against the capacitor stack corner.

Figure 4:
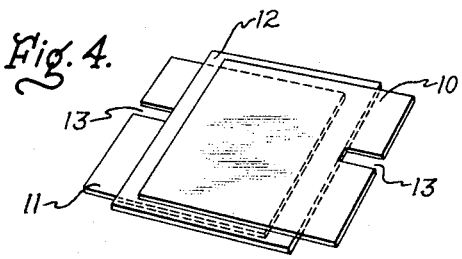
Fig. 4 shows a modification of the Fig. 1 device.
Figure 4A:
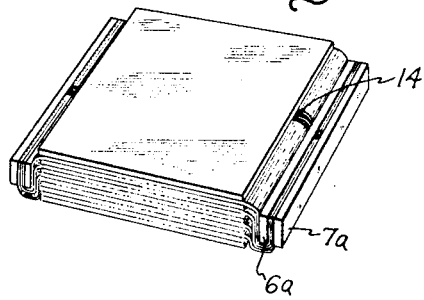
Fig. 4a shows in perspective an assembled capacitor incorporating the modification shown in Fig. 4.

Fig. 4 illustrates another embodiment of the device, wherein instead of drilling holes in the foils for passage of the lead wires, the alternating foils 10, 11 separated by a dielectric layer 12 are preformed with suitable notches or recesses 13 at their exposed edges. When aligned in the assembled capacitor stack, shown in Fig. 4a, the notches 13 form channels 14 through the assembly for receiving the lead wire, the latter being omitted from the showing in Fig. 4a for clarity. In this embodiment, it is necessary to have at least one metallic strip 6a or 7a welded to the folded foil margins to enclose the channel formed by recesses 13, and preferably both strips should be used.

Figure 5:
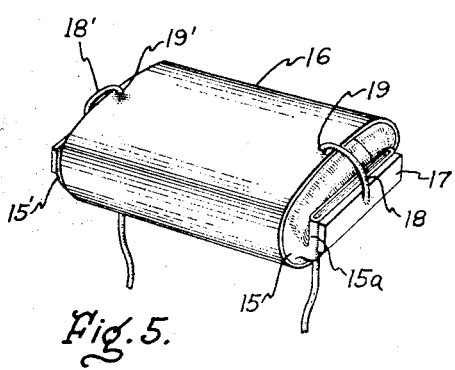
Fig. 5 illustrates in perspective a wound type capacitor embodying the invention.

The invention is also applicable to wound type capacitors as shown in Fig. 5. In this embodiment oppositely exposed foils 15, 15' separated by dielectric layers (not shown) may be wound in the usual manner and the wound roll 16 may, if desired, be pressed substantially flat. Exposed foil margins 15a are folded over in compressed form against the end of the roll and have welded thereto metal strip 17, to which lead wire 18 is joined by a soldered or welded connection. The capacitor roll 1 is provided with apertures 19, 19' passing through the respective foils 15, 15', and the threading wires 18, 18' through holes 19, 19' provide substantially increased stress resistance to the terminal connection thus made to the wound capacitor assembly, similarly to the above-described terminal structures.

Figure 6:
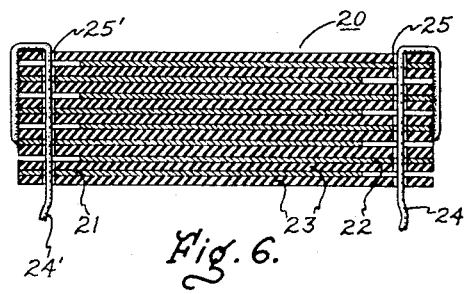
Fig. 6 is a sectional view showing still another embodiment of the present device.

In a further embodiment as shown in Fig. 6, the invention is applied to a capacitor 20 which may be of either wound or stack type having electrode foils or plates 21, 22 of opposite polarity offset toward opposite ends of the capacitor, but wherein the electrodes do not project laterally beyond the dielectric sheets 23 as in the previously described embodiments. In this embodiment flexible leads 24, 24' are joined by known methods such as spraying (Schooping) or soldering to the respective exposed foil edges at opposite ends of the capacitor, and then pass around the corners of the capacitor assembly through apertures 25, 25' formed in the superposed dielectric foil layers. The connection of the flexible lead to the exposed foil edges by the soldering or spraying process is normally weaker than in the case of the previously described construction where the lead is joined to a much greater mass and area of the projecting foil material, and the provision for threading the flexible lead back through a hole in the capacitor assembly in accordance with the invention is of particular advantage in strengthening the terminal connection of the wire to the electrode foils in this embodiment.

There is thus provided by the invention an improved terminal construction for electrical capacitors and similar devices which has the advantages of being conveniently and economically manufactured while affording a strong durable mechanical connection and good electrical contact between a flexible lead and the capacitor electrodes.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An electrical capacitor comprising an assembly of superposed alternating electrically conducting layers of opposite polarity composed of metal foil insulated from each other, the foil layers of each polarity having margins projecting beyond the foil layers of the other polarity at opposite sides of said assembly, the projecting foil margins having portions folded in compressed condition against the assembly, said assembly being formed with apertures passing through said margins of the foil layers of respective polarity, and terminal leads for said assembly consisting solely of flexible electrically conducting leads joined at one end to the folded portions of the respective foil layers and passing through the apertures adjacent thereto.

2. An electrical capacitor comprising an assembly of superposed alternating electrode foils of opposite polarity insulated from each other, the electrode foils of each polarity having margins projecting beyond the foils of the other polarity at opposite sides of said assembly, said projecting foil margins having portions folded in compressed condition against the assembly so as to form a fold having an open side and being sandwiched between inner and outer conductive reinforcing members joined thereto, said assembly being formed with apertures passing through said margins of the foils of respective polarity, and terminal leads for said assembly consisting solely of flexible electrically conducting leads joined at one end to the outer reinforcing members, passing over said open side of the fold formed by said folded foil portions and extending through the apertures adjacent thereto.

3. An electrical capacitor as defined in claim 1, wherein said apertures are formed by recesses in the edges of the projecting margins of the electrode foils.

4. An electrical capacitor as defined in claim 1, wherein said assembly is composed of a laminated stack of alternating foil and dielectric sheets.

5. An electrical capacitor as defined in claim 1, wherein said assembly is formed of a roll of wound alternating foil and dielectric sheets.

References Cited in the file of this patent

UNITED STATES PATENTS

| 1,870,803 | Fried | Aug. 9, 1932 |

FOREIGN PATENTS

| 198,362 | Great Britain | Aug. 25, 1924 |
| 659,433 | Great Britain | Oct. 24, 1951 |
| 77,490 | Denmark | May 3, 1954 |